Jan. 12, 1960 G. H. LAYCOCK 2,920,880
DEVICES EMPLOYING STRAIN GAUGES AND ADAPTED
TO MEASURE WEIGHT OR FORCE
Filed April 17, 1956 2 Sheets-Sheet 1

INVENTOR
GEOFFREY HUGH LAYCOCK

Cushman, Darby & Cushman
ATTORNEYS

United States Patent Office 2,920,880
Patented Jan. 12, 1960

2,920,880

DEVICES EMPLOYING STRAIN GAUGES AND ADAPTED TO MEASURE WEIGHT OR FORCE

Geoffrey Hugh Laycock, Stevenston, Scotland, assignor to Imperial Chemical Industries Limited, London, England, a corporation of Great Britain Application April 17, 1956, Serial No. 578,737

Claims priority, application Great Britain August 2, 1955

6 Claims. (Cl. 265—27)

The present invention is concerned with weight measuring devices and is particularly concerned with weight measuring devices comprising electric wire resistance strain gauges.

Some applications of the electrical resistance strain gauge introduced by Simmons and Ruge in 1939 are for instance described in a paper entitled "Electrical Weighing," H. I. Andrews, Proceedings of the Institute of Electrical Engineers, 97, part 1, 1950, pp. 98–111.

It is known that bonded strain gauges generally slip under load if the loading is continued for long enough. Unbonded strain gauges on the other hand do not rely on a bonding adhesive of doubtful mechanical properties to keep them in intimate contact with the material being strained, but are held in position by the tension in the strain gauge wires and so there is no possibility of slip unless plastic deformation takes place in the wire or in the strained material.

The object of the present invention is to provide a weight measuring device which comprises unbonded electric wire resistance strain gauges and which is so designed as to give a satisfactory compromise between sensitivity and ease of manufacture and robustness and which has no zero drift during use and no drift during changes of ambient temperature.

In summary, it is contemplated by the present invention that strain gauges or wires be arranged in a novel manner and under tension on a metal post, preferably all under the same tension, and that the metal post include solid and hollow portions with at least one of said gauges surrounding each of said portions, and with the ends of the gauges rigidly attached to an insulating layer between the gauges and the metal post.

Further objects will be in part obvious and in part pointed out hereinafter.

The invention and the novel features thereof may best be made clear from the following description, and the accompanying drawings in which.

Figure 3:
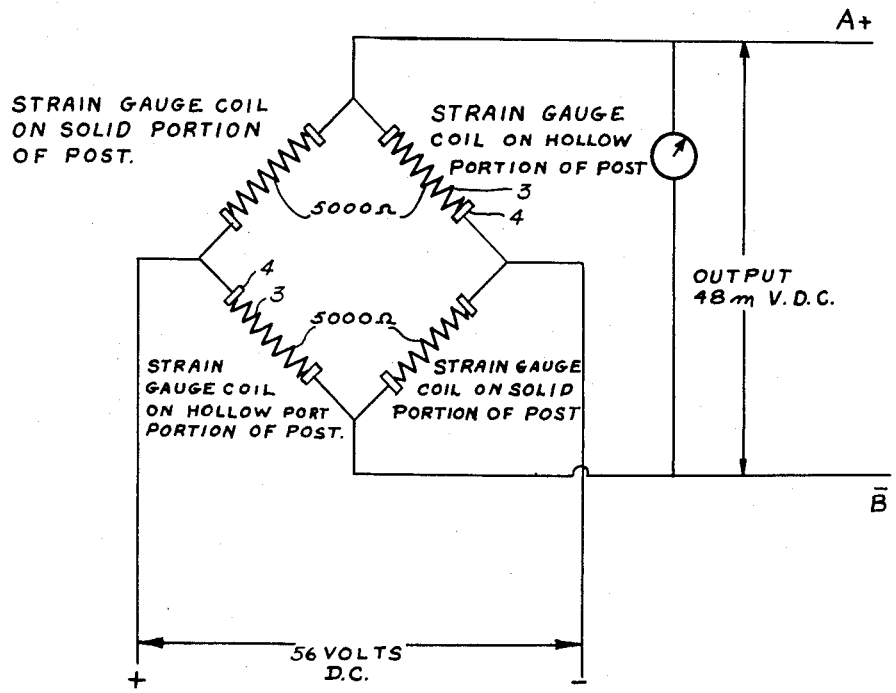
Figure 3 is a diagrammatic view of an exemplary and simplified circuit arrangement for the gauges shown in Figure 1.

A weight measuring device according to the invention is shown in the drawing and comprises a solid cylindrical metal post 1 hollowed out at at least one end, preferably both ends, and unbonded electric wire strain gauges 3, preferably an even number of substantially identical electric wire strain gauges, normally four; wherein each gauge is space wound singly under tension round the cylindrical metal post so that preferably each hollow portion has one strain gauge round it and the central solid portion has two strain gauges round it, as shown; wherein each electric wire strain gauge is effectively insulated from the metal post by a layer 2 of insulating material which permits any changes in dimension of the post to be communicated without distortion to each turn of wire in each gauge; wherein each end of the wire of each electric wire strain gauge is rigidly attached to the rigid insulating material which is itself rigidly attached to the metal post; and wherein the ends of the strain gauges, although attached to the insulating material are free to be suitably electrically connected such as by metal tags 4 to form a part of an electric measuring circuit as for example to form a part of an electric measuring bridge or potentiometer such as that indicated diagrammatically in Figure 3.

Figure 2:
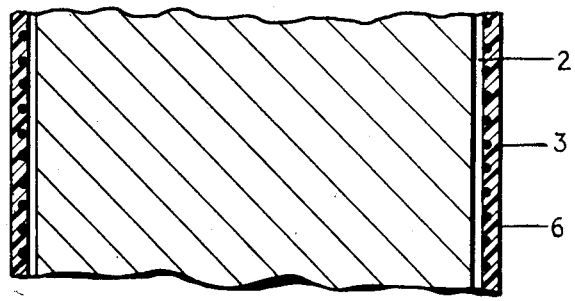
Figure 2 is an enlarged and fragmentary vertical sectional view of a portion of the center post of Figure 1.

In the illustrated form of the invention, which is suitable for weighing 9 tons, the metal center post may be 5 inches long and 1½ inches in diameter hollowed out at each end with four strain gauges 3 wound therearound at equal tension, as shown. Numeral 5 indicates insulators, suitably connected to the post 1 and tags 4, and 6 is a wax coating surrounding insulating layer 2 (see Figure 2). A suitable casing 11 encloses the post 1, with a second casing part 7 extending into casing 11 to define a space for the cage 8 carrying the ball bearings 9 for a purpose to be explained hereinbelow. A retaining ring 10 may be provided on the bottom of casing part 7, as shown.

If all the electric wire strain gauges are of substantially equal electrical resistance it is necessary to have an even number of electric wire strain gauges.

Preferably the outside diameter of the metal post is constant over its whole length except for a small flange at each end.

Furthermore the weight measuring device of the invention is preferably housed in a housing, shown in the drawing in vertical position. It should be understood that the weight measuring device of the invention may be satisfactorily operated irrespective of the position of the housing and that the housing is shown in the drawings in vertical position merely for illustrative purposes. The housing itself is so designed that no transverse thrusts can be transmitted to the weight measuring device. This can be achieved, in the manner indicated heretofore, by making the housing in two halves 7, 11 and constraining the top half by ball bearings 9 so that it can only move longitudinally with respect to the bottom half. The ball bearings carry substantially all the transverse thrusts and the weight measuring device carries all the longitudinal thrusts. The housing can be fabricated for instance from mild steel.

It is preferable to provide all the metal parts of the weight measuring device with the coating 6, preferably of paraffin wax and this can be achieved by for example immersing the weight measuring device for four hours in a bath of paraffin wax maintained at 100° C. and at a low absolute pressure as for instance 0.02 mm. of mercury. In this way a thick coating of paraffin wax can be left on the weight measuring device after cooling to provide mechanical protection for the electric wire strain gauges during fitting of the device into its housing.

The solid cylindrical metal post hollowed out at both ends can be for instance a rod of high tensile nickel-chromium-molybdenum steel which is hollow for one quarter of its length at each end. For instance for a weight measuring device designed to carry 9 tons the rod can be 4½ inches long and 1 inch in diameter with a bore of 0.82 inch diameter. This rod can have for instance four coils of 0.0016 inch diameter constantan wire wound in tension on it, two on the solid part and two on the hollow part. The coils are insulated from the rod by for instance 0.002 inch thick coil winding paper. The strain gauges so formed can be stuck down with a cement. The ends of the coils are fixed to the metal tags 4, suitably rigidly attached to the insulating strips 5 rigidly fixed to the metal post so that each coil is kept in position by the tension in the wire. The coils thus formed can therefore be treated as unbonded strain gauges to measure the Poisson swelling of the rod under compression. Each of the coils can have a resistance for instance of 100 to 5,000 ohms, and can be connected in the form of a Wheatstone bridge.

The following are typical values for the preferred embodiment of the weight measuring device of the invention when designed to carry 9 tons and these values illustrate the operation of the device. The increase in diameter of the hollow part of the rod under maximum working load is about 0.001 inch which causes an increase in circumference of about 0.0031 inch. This causes a change in resistance of a 5,000 ohm coil of about 10 ohms. The corresponding change in resistance of the coils on the solid part of the rod is about 1.5 ohms. The coils of the hollow part of the rod, as seen in Figure 3, are arranged to be in opposite arms of the Wheatstone bridge and there is therefore an out of balance of about 17 ohms. If the bridge has 56 volts D.C. across it the output for full load is about 47.6 mv.

The resistance of a single strain gauge always changes with changes in ambient temperature. Usually one of the main difficulties in the design of a weight measuring device comprising electric wire resistance strain gauges is to make it insensitive to changes in temperature. Efficient temperature compensation has been obtained in the weight measuring device of the invention by winding four unbonded electric wire resistance strain gauges in the form of coils on the metal post at the same time and at the same tension and as nearly as possible at the same temperature. It is for this reason that the outside diameter of the metal post is constant over its whole length except for a small flange at each end. On such a post the four coils can be wound on to its surface in quick succession to maintain the same speed of winding and therefore the same tension. As the four coils are identical they should have the same gauge factor and as the rod expands evenly along its whole length with increasing temperature each coil should increase its resistance in exactly the same proportion and the output from the Wheatstone bridge should be unchanged.

The constantan wire has for instance a resistance of 9.7 ohms per inch and a temperature coefficient of resistance of —0.0000026 per degree centigrade. This wire can be wound at a tension of at least 25 grams. The constantan wire preferably has enamel insulation.

Figure 1:
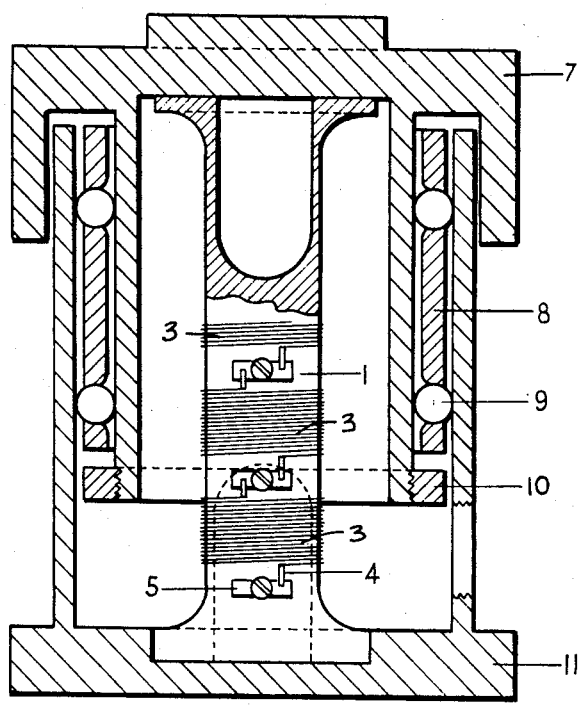
Figure 1 is a partially cut away vertical sectional view illustrating somewhat diagrammatically a weight measuring device embodying the invention.

Referring now to Figure 3, it will be seen that the two strain gauges on the hollow portions of the post form opposite arms of the Wheatstone bridge and the two strain gauges on the solid portion of the post constitute the other two arms. The Wheatstone bridge preferably is situated within the housing shown in Figure 1. The reason for this is to minimize any possibility of small resistances due to faulty contacts being introduced in the bridge circuit itself, where the effect of the resulting imbalance on the potential difference between the output terminals A and B would be much more serious than the effect of the introduction of a similar small resistance in the line leading from the bridge circuit to the mains terminals.

Input direct current voltage, illustrated as 56 volts, is applied to the oppositely situated conductors in the Wheatstone bridge circuit, each connecting one of the strain gauges wound on the solid portion of the post to a strain gauge wound on the hollow portion of the post. In the starting position when there is no load the potential difference between the connecting conductors leading to the output terminals A and B will be zero. In the case where the post throughout its length is at the same temperature, the resistances of the four strain gauges will be identical, and if there is a temperature gradient down the post, the arrangement of the strain gauges is such that this potential difference will still be zero. When a load is applied, the distortion of the post at the hollowed portions will be greater than that in the solid portions, so that the resistance of the strain gauges on the hollow portions will be increased to a greater extent than those of the strain gauges on the solid portions of the post and there will be a potential difference between A and B. Should the object being weighed be hot, so that a temperature gradient develops along the length of the post, the magnitude of the potential difference between A and B will not be affected, because of the arrangement of the respective strain gauges in the Wheatstone bridge circuit.

The figure of 5,000 ohms is the initial resistance of the strain gauges as wound on the post, and as has been previously stated with regard to the materials, etc., and the load, these figures are altered to 5,010 for the gauges on the hollow portions of the post and 5,001.5 for the gauges on the solid portions of the post; so that there is an imbalance of twice the difference, namely twice 8.5 ohms, and this would lead to an output potential difference of 47.6 mv.

What I claim is:

1. Apparatus of the character described having a metal post and strain gauges of electrically conducting wire attached to said post in such a manner that when the post is subjected to compression between its ends the mechanical strain in the gauges is changed differentially and as a consequence also the electrical resistance thereof, whereby the changes in resistance can be used for determining the magnitude of the force acting on the post, said device being characterized in that said post is cylindrical, an electrically insulating layer being arranged on the outside of said post, said post being hollow at each end and including an intermediate solid portion, said gauges comprising two pairs of windings, one of the windings of each of said pairs being placed around each of the hollow ends of said post and the other winding of each of said pairs being placed around the solid portion of the metal post, an electrical measuring bridge circuit including said windings and wherein the two windings on the hollow ends of the post form opposite arms of the bridge and the two windings on the solid portion of the post constitute the other arms of the bridge, said windings without being secured to the insulating layer being wound in spiral thereon at tension, said windings further being wound in equal tension and retained in that condition in a single layer in which the individual turns of the windings are spaced from each other, and which windings have all their ends rigidly attached to the insulating layer, whereby compression of the post causes the windings around the hollow portion of the post to be subjected to greater changes of strain than the windings around the solid portion of the post, and whereby slip of the wire in the gauges relatively to the post is avoided and as a result thereof changes of zero position of the device are also avoided.

2. The apparatus as claimed in claim 1 wherein the strain gauges are substantially identical.

3. The apparatus as claimed in claim 1 wherein the outside diameter of the metal post is constant over its whole length except for a small flange at each end.

4. The apparatus as claimed in claim 1 further including a housing for said post and said gauges, said housing including means for preventing the transmittal of transverse thrusts to the weight measuring device.

5. The apparatus as claimed in claim 1 wherein all the metal parts thereof are provided with a coating of paraffin wax.

6. The apparatus as claimed in claim 1 wherein said cylindrical metal post is a rod of high tensile nickel-chromium-molybdenum steel which is hollow for one quarter of its length at each end.

References Cited in the file of this patent

UNITED STATES PATENTS

| | | |
|---|---|---|
| 2,487,595 | Ruge | Nov. 8, 1949 |
| 2,488,349 | Thurston | Nov. 15, 1949 |
| 2,566,326 | Guillemin | Sept. 4, 1951 |
| 2,592,009 | Clement et al. | Apr. 8, 1952 |
| 2,663,781 | Rundell | Dec. 22, 1953 |
| 2,813,958 | MacDonald | Nov. 19, 1957 |